W. C. CARLTON & J. W. BAKER.
Perch-End for Vehicles.
No. 216,938. Patented July 1, 1879.
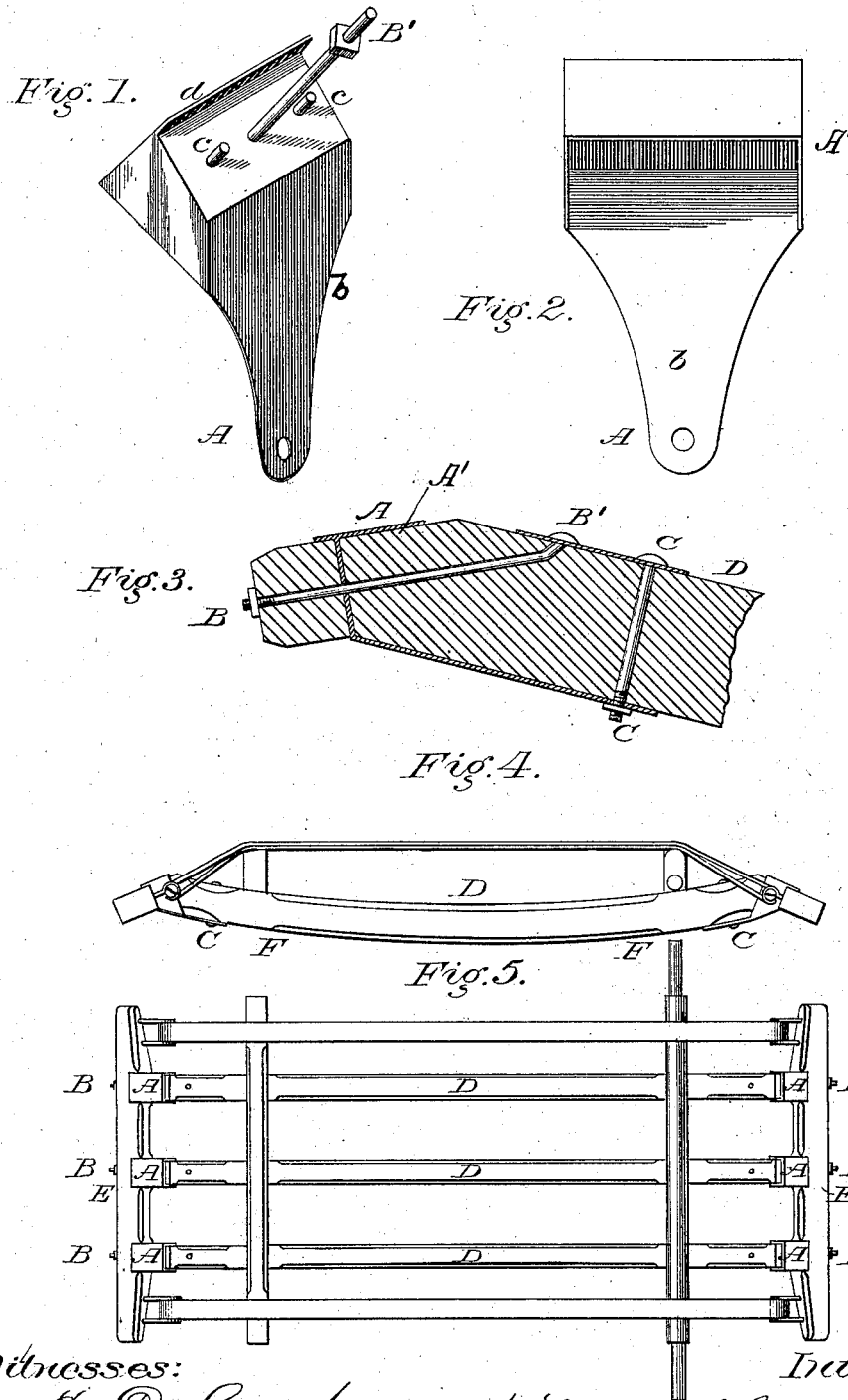

UNITED STATES PATENT OFFICE.

WILLIAM C. CARLTON AND JOSEPHUS W. BAKER, OF BOISE CITY, IDAHO TERRITORY.

IMPROVEMENT IN PERCH-ENDS FOR VEHICLES.

Specification forming part of Letters Patent No. 216,938, dated July 1, 1879; application filed February 17, 1879.

*To all whom it may concern:*

Be it known that we, WILLIAM C. CARLTON and JOSEPHUS W. BAKER, of Boise City, Ada county, Idaho Territory, have invented a new and useful Improvement in Thorough-Brace Wagons; and we do hereby declare the following to be a full, clear, and exact description thereof, reference being had to the accompanying drawings, and the letters of reference marked thereon.

Our invention relates to certain improvements in thorough-brace wagons, carriages, &c.; and consists in a malleable-iron perch-end, which is bolted to the end of the perch, and also to the head-block.

In the drawings, Figures 1 and 2 are views from opposite sides of our perch-end. Fig. 3 is a vertical section, showing the perch-end applied to the perch and head-block; and Fig. 4 is a side elevation, and Fig. 5 a plan, of a perch with our invention applied thereto.

A is the perch-end, constructed with a socket, A', which fits over the end of the perch. It has formed on its under rear corner or edge an extension or wing, b, which projects along and on the under side of the perch, to which it is held by a bolt, C. It also has a short flange, d, which projects outward from its upper corner, and rests on the upper side of the head-block B, as shown in Fig. 3.

The perch-head is provided with two dowels, c, which project from its outer end and fit into holes in the head-block, and it is secured to the perch and head-block by the bolt B'. The socket A' is made slightly tapering inward, so that it can be more readily and snugly fitted to the end of the perch. The flanges or wings b and d are arranged to project from opposite corners of the socket, as shown, so that they will act in opposition to each other, and thus give a firmer hold to the perch-end in its position on the perch and head-block.

Our invention is applicable to all kinds of vehicles that are set on a thorough-brace. It imparts strength and durability, while it materially reduces the cost of keeping wagons of that kind in repair.

The benefits to be derived from the use of our invention are the saving of material and labor. It is a fact well known to those conversant with the use of thorough-brace wagons that the perches, after a short time in use, bend or spring down, and thereby become unfit for use, and have to be taken out and a new one put in its place. The method of making the perch last longer than it otherwise would, by putting a piece of timber on the top of the perch, which takes the spring out of it, is liable to cause the perch to break at the point designated by F in Fig. 4, and a perch is never as good after having such pieces of timber fastened to the top.

By the use of our invention, (the perch-end,) whenever the perch bends down or springs, to the detriment of the vehicle, it can be easily taken out and turned over, (the other side up,) and it is equally as good as, if not better than, when new, which can be done with a very little labor, without any cutting or making new holes in the perch. It is done by taking out the bolts B' and C, Fig. 3.

Without the use of the perch-end the perch could not be turned, for the reason that it would be too short.

Our invention can be used on the same head-blocks now in use, and also old perches that have become useless for that purpose without the use of the perch-end.

Having described our invention, what we claim, and desire to secure by Letters Patent, is—

The perch-end A, formed of a socket, A', and flanges b and d, arranged as described, and adapted to be applied to the end of the perch and to the head-block, and held by a suitable bolt or bolts, substantially as set forth.

Dated February 6, 1879.

WILLIAM C. CARLTON.
JOSEPHUS W. BAKER.

Witnesses:
I. D. CLEEK,
JOHN S. GRAY.